Figure 14:
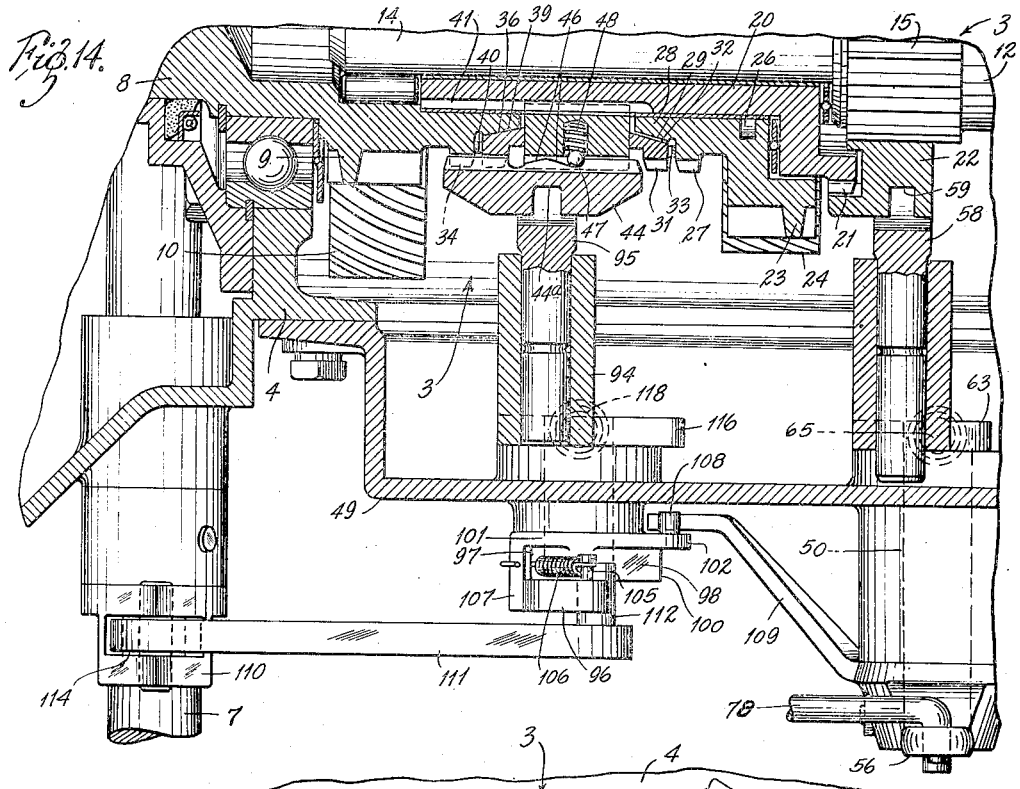

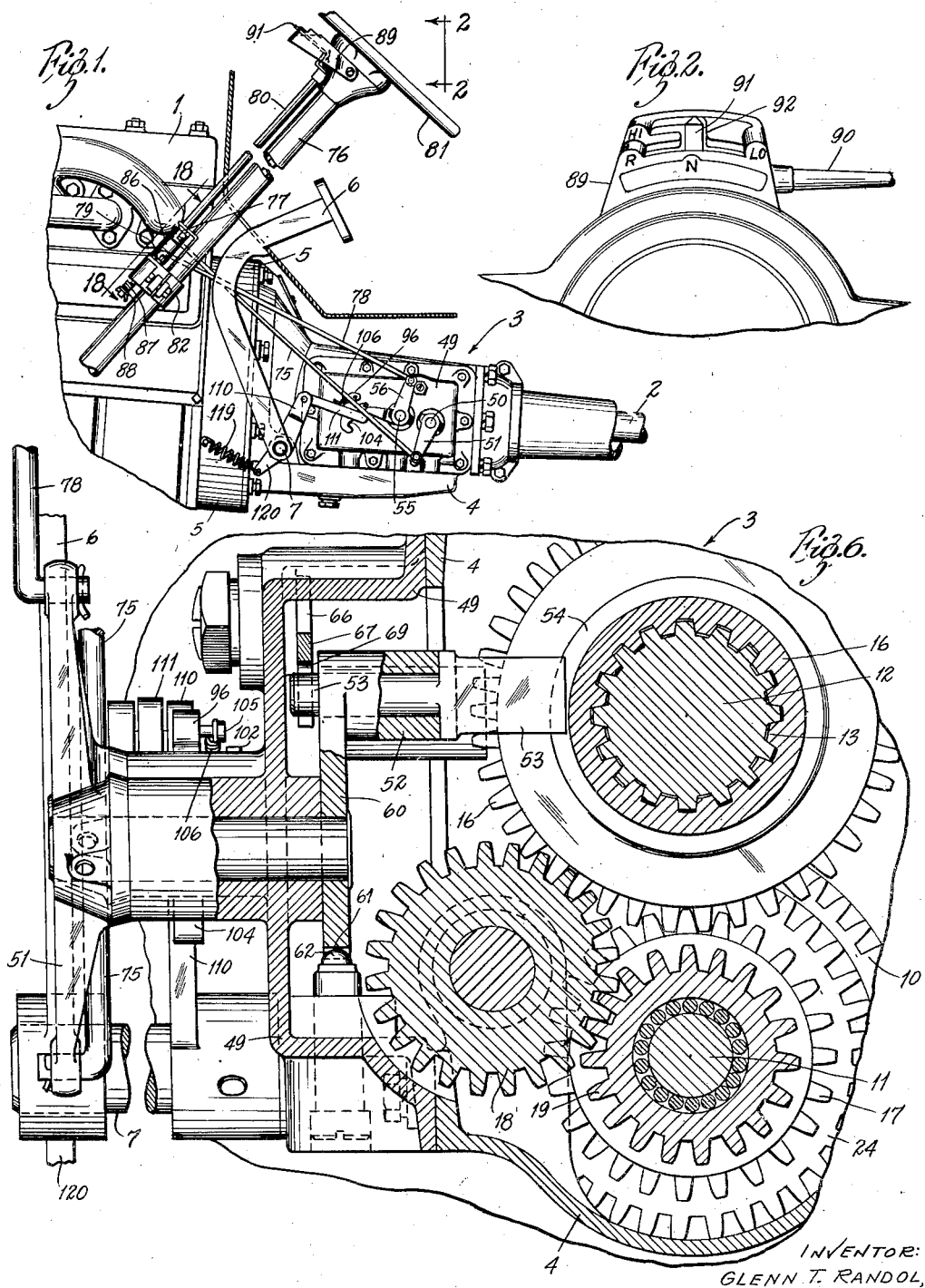

Aug. 17, 1943.  G. T. RANDOL  2,327,063
CHANGE SPEED TRANSMISSION AND CONTROL MECHANISM THEREFOR
Filed Sept. 10, 1941  8 Sheets-Sheet 2
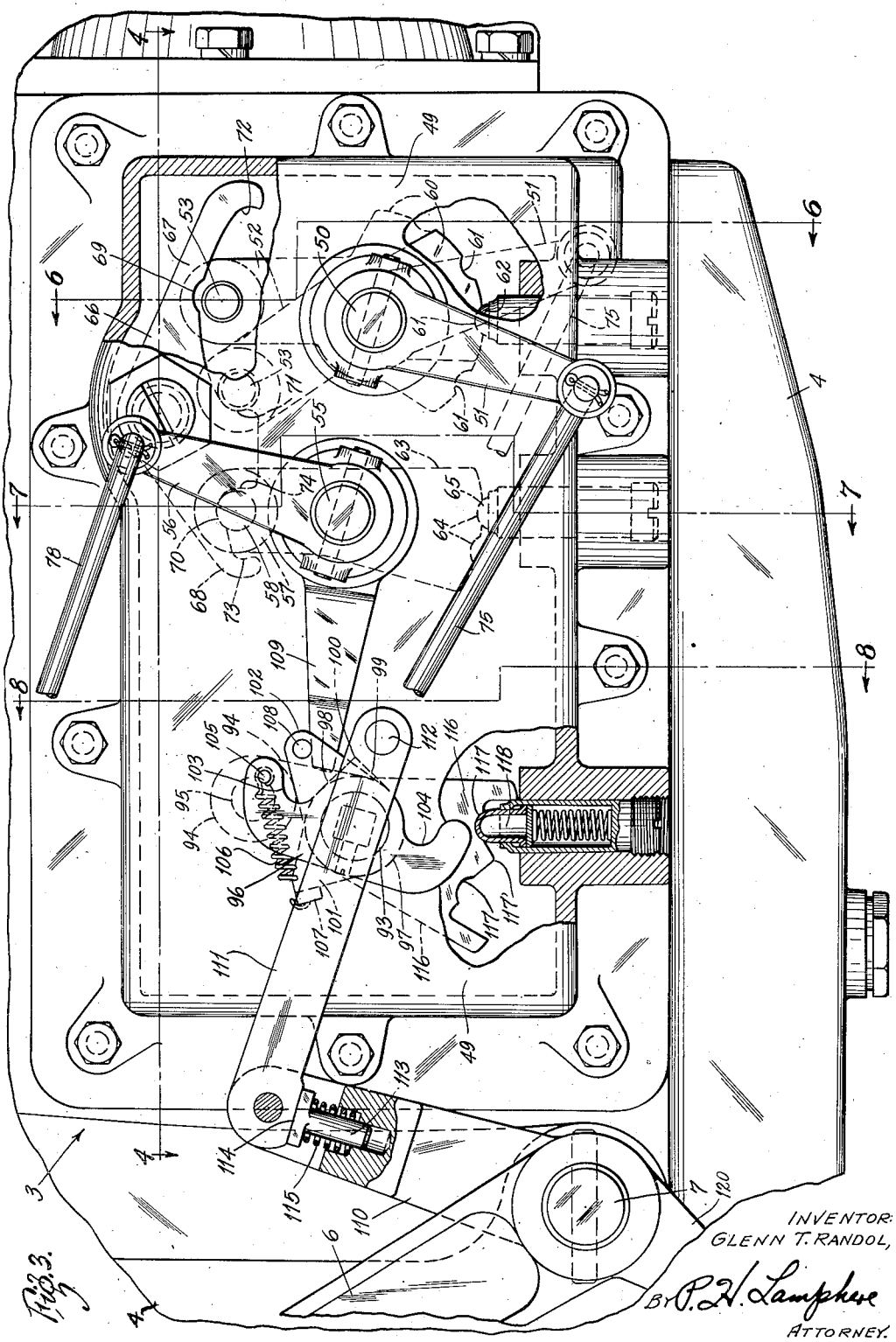
INVENTOR:
GLENN T. RANDOL,
BY P. H. Lamphere
ATTORNEY.

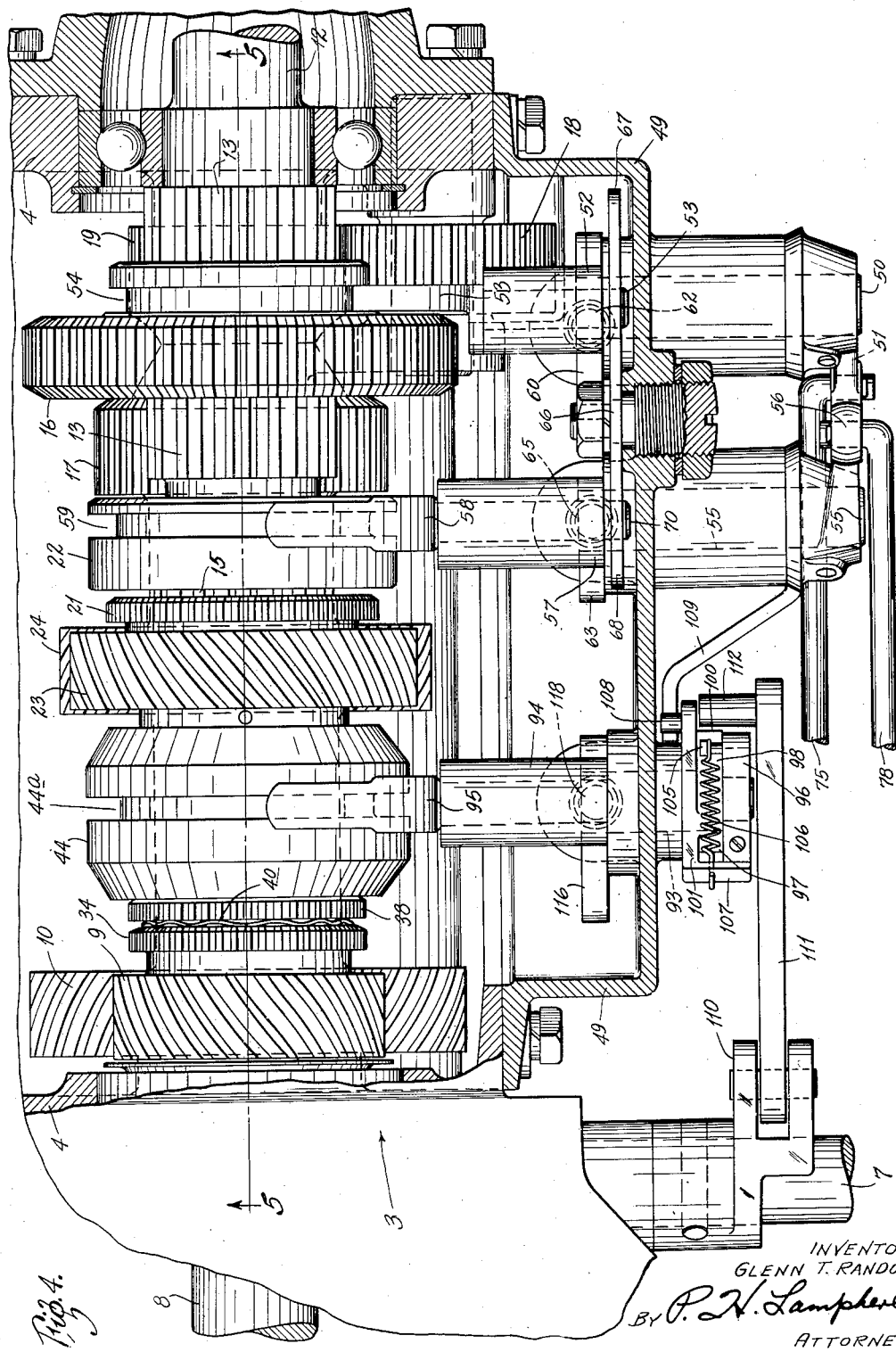

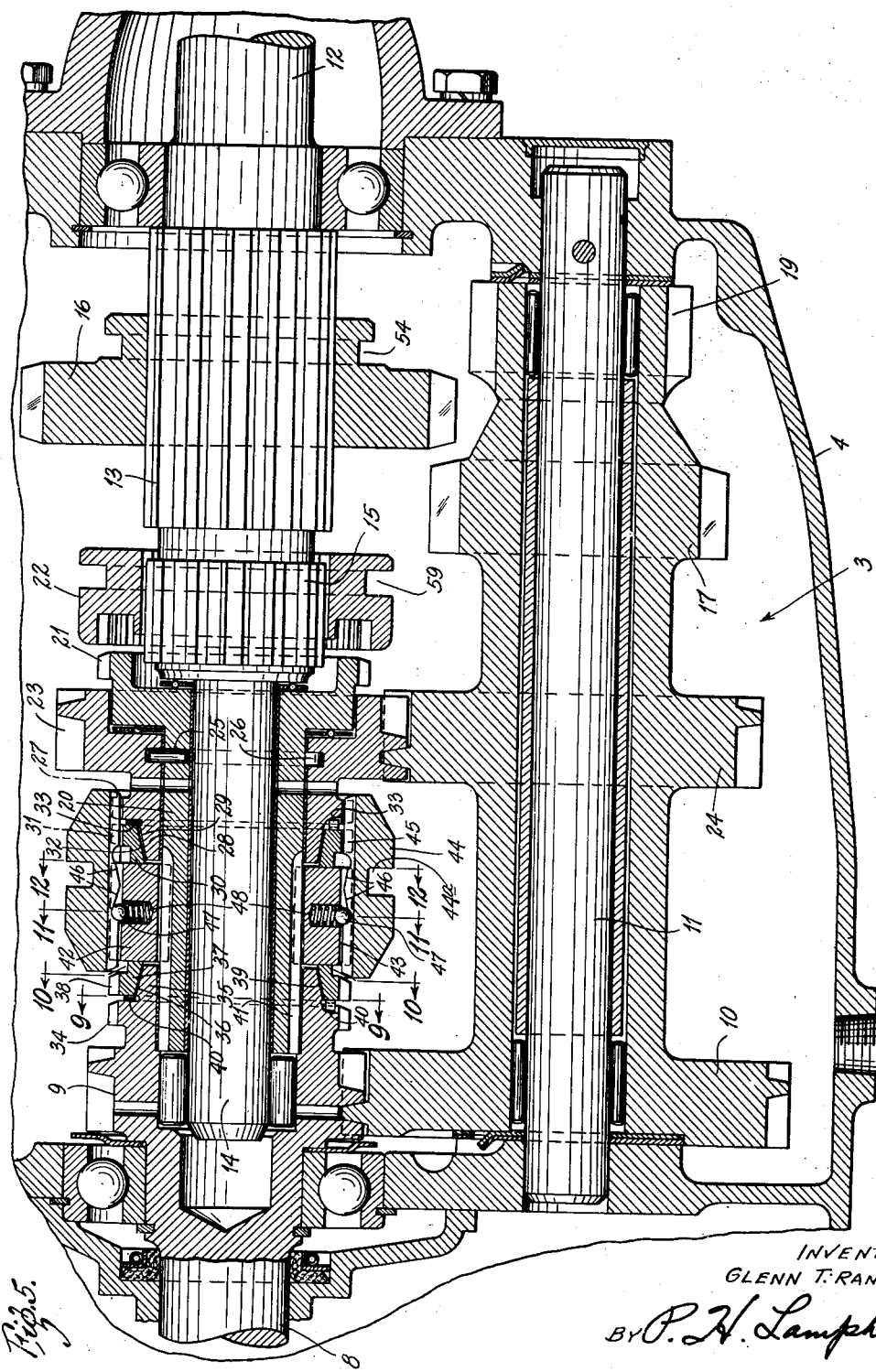

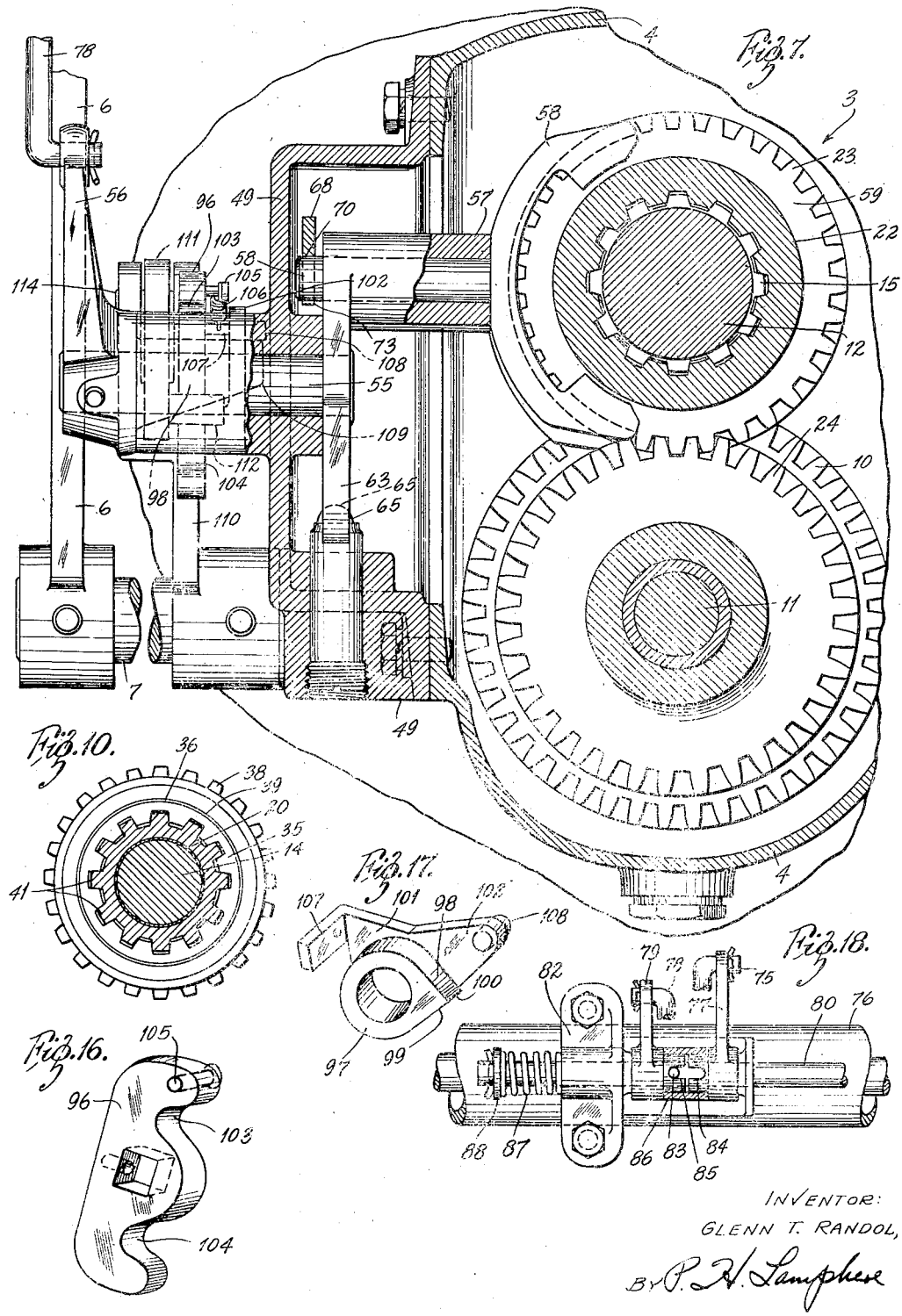

Aug. 17, 1943.   G. T. RANDOL   2,327,063
CHANGE SPEED TRANSMISSION AND CONTROL MECHANISM THEREFOR
Filed Sept. 10, 1941   8 Sheets-Sheet 6
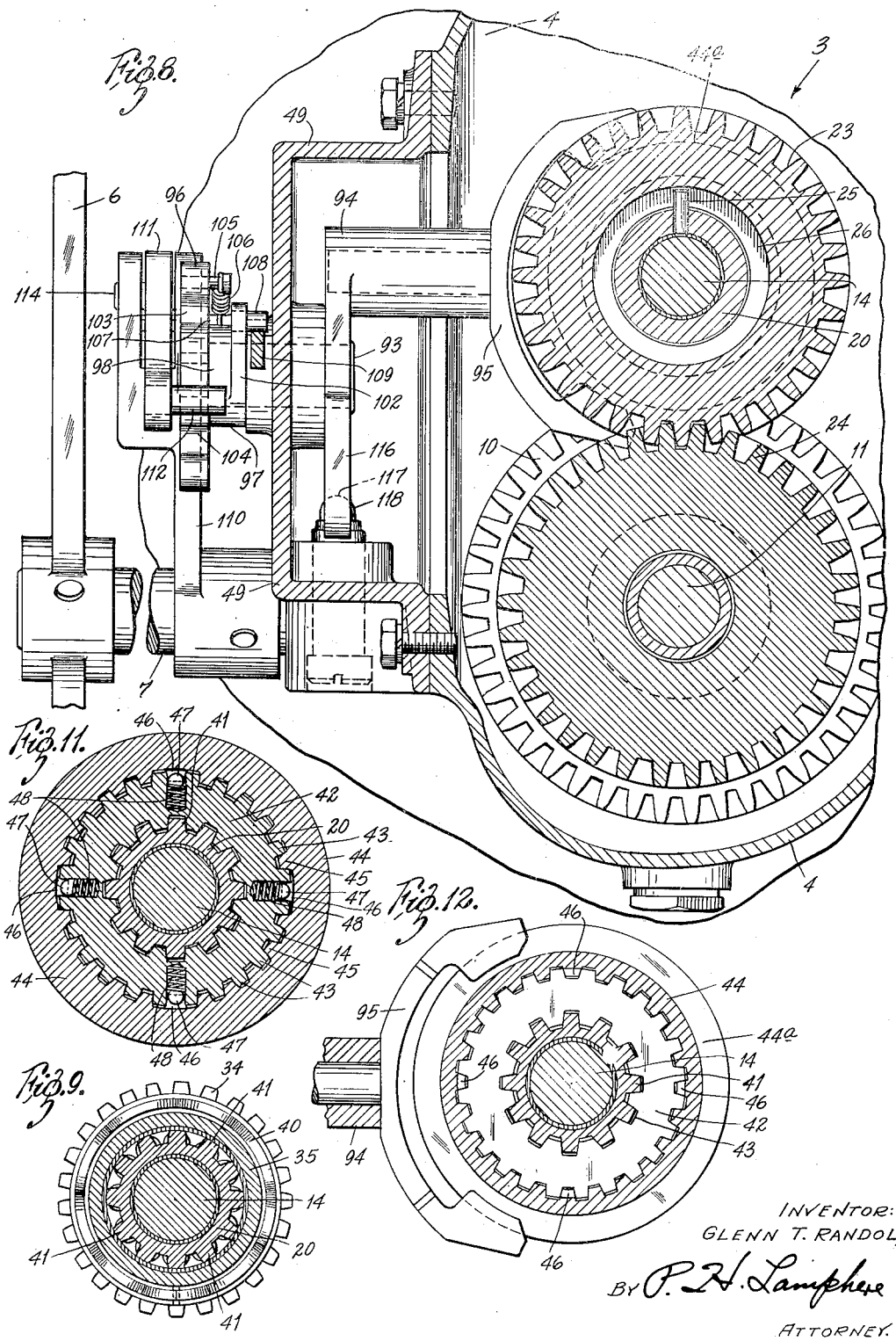
INVENTOR:
GLENN T. RANDOL,
BY P. H. Lamphere
ATTORNEY.

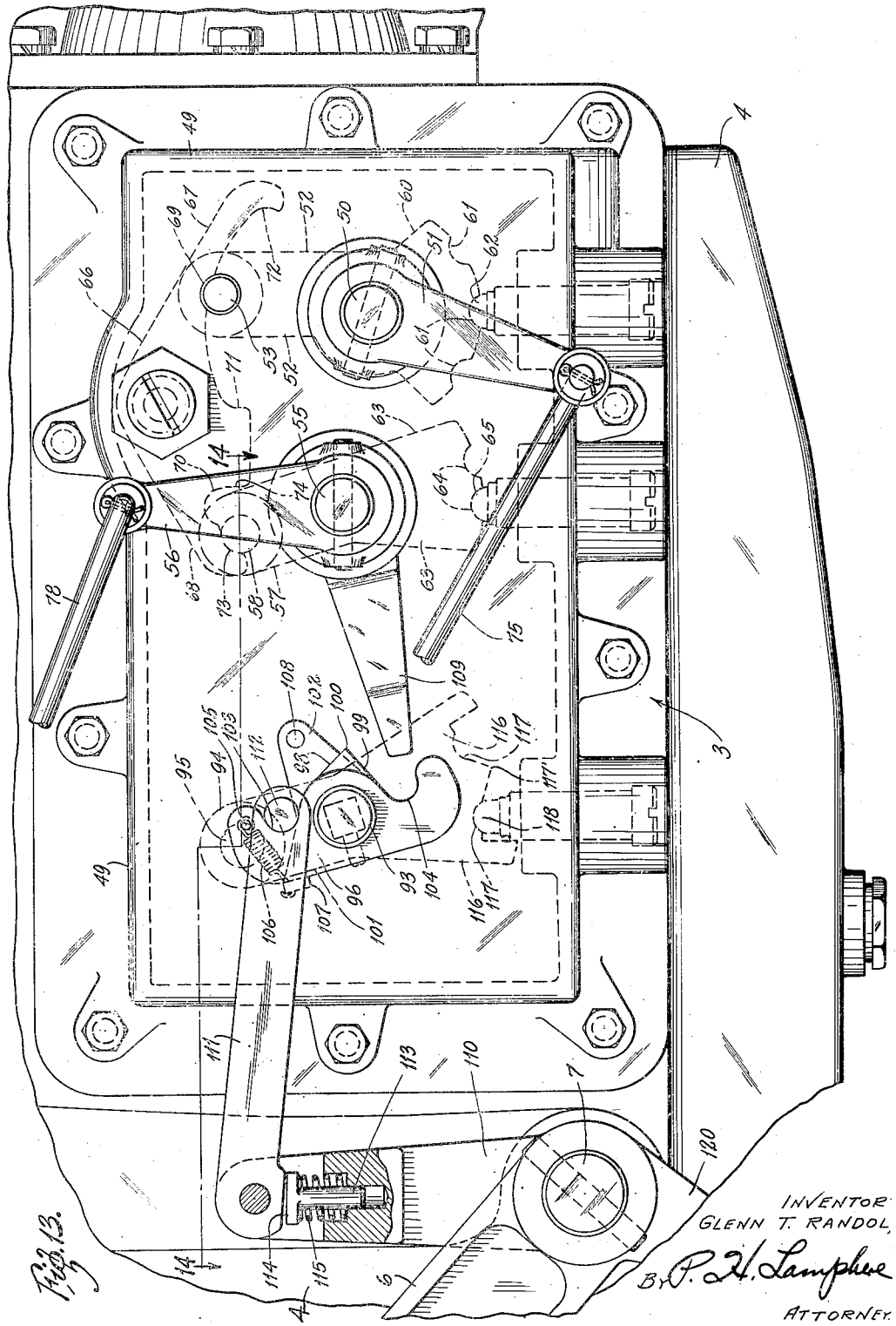

Aug. 17, 1943. G. T. RANDOL 2,327,063
CHANGE SPEED TRANSMISSION AND CONTROL MECHANISM THEREFOR
Filed Sept. 10, 1941 8 Sheets-Sheet 8

INVENTOR:
GLENN T. RANDOL
BY P. H. Lamphere
ATTORNEY.

Patented Aug. 17, 1943

2,327,063

UNITED STATES PATENT OFFICE 2,327,063

CHANGE SPEED TRANSMISSION AND CONTROL MECHANISM THEREFOR

Glenn T. Randol, St. Louis, Mo., assignor of forty per cent to William M. Liddon, Nashville, Tenn.

Application September 10, 1941, Serial No. 410,247

20 Claims. (Cl. 192—3.5)

My invention relates to an improved change speed transmission and control mechanism therefor whereby certain speed ratios can be obtained alternately.

One of the objects of my invention is to so construct a change speed transmission and associate therewith a control mechanism that a quick change can be made from one gear ratio to another.

Another object of my invention is to so construct a synchronized change speed transmission embodying a shiftable clutch element between two gears provided with clutch teeth that the synchronizing means associated with the cooperating clutch teeth of one gear ratio will begin to function prior to the disengagement of the cooperating clutch teeth of the other gear ratio when the shiftable clutch element is moved from one operative position to the other.

Still another object of my invention is to provide a shiftable clutch element and synchronizing means for alternately obtaining either of two speed ratios with means for causing the clutch element to be in either of its operative positions, thus eliminating the normal neutral position.

A further object of my invention is to provide clutch means separate from the oppositely shiftable synchronized clutch element which will be capable of neutralizing the gearing of the two speed ratios with which the clutch element is associated so that the transmission may be neutralized notwithstanding the shiftable clutch element is in an operative position.

Another object of my invention is to produce a change speed transmission and provide a control mechanism therefor which will permit the operator to condition the gearing of one of two speed ratios for operation by moving a manual member from a normally inoperative position to another and then to obtain alternate operativeness of said two speed ratios by the operation only of the second manually-controlled member, said transmission and control mechanism also being so arranged that the gearing can be neutralized at any time by the movement of the first named manual member back to its normally inoperative position.

Yet another object of my invention is to produce a change speed transmission which can be controlled by purely mechanical mechanism including levers and connecting linkage so that the operator can automatically obtain the lower speed ratio of two speed ratios by a manual setting of a hand lever and then subsequently obtain alternate operativeness of the two speed ratios by successive movements of another manual control member such, for example, as the clutch pedal, said transmission and control mechanism also being so constructed and arranged that the transmission can be neutralized at will by the return of the hand lever to its inoperative position whereby the control mechanism will be automatically conditioned so that upon a subsequent resetting of the hand lever and operation of the other manual control member the lower of the two speed ratios will be caused to be operative first.

Figure 15:
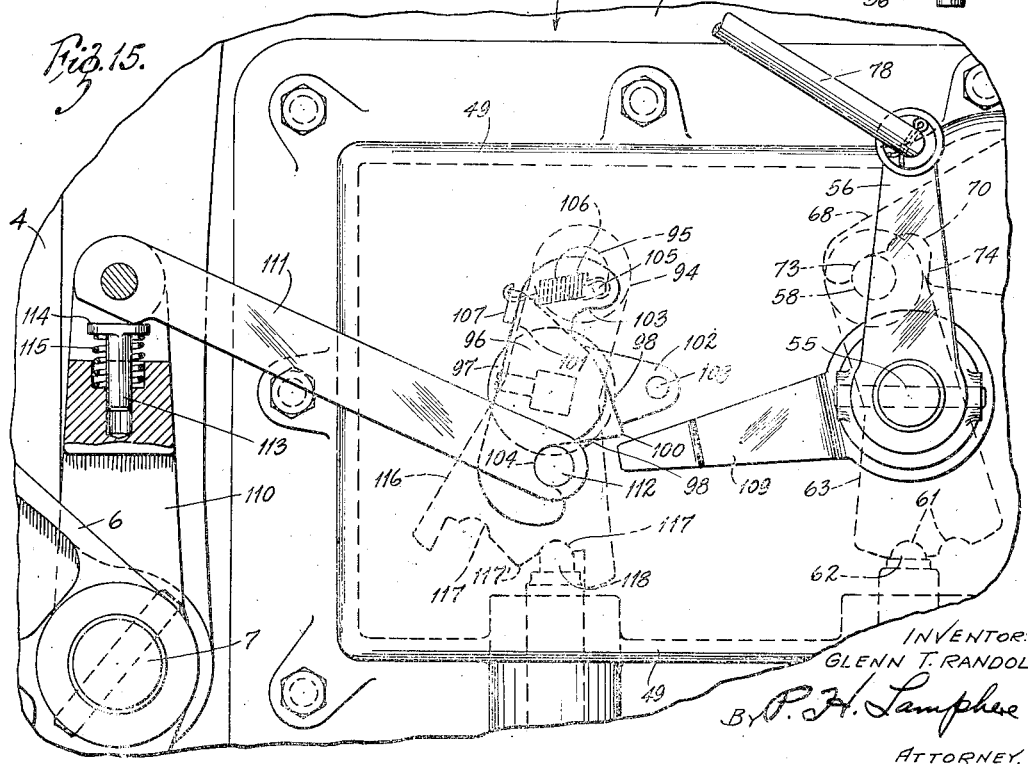

Other objects of my invention will become apparent from the following description taken in connection with the drawings in which Figure 1 is a side view of a portion of a motor vehicle showing a transmission and control means associated therewith and embodying my invention; Figure 2 is a view taken on the line 2—2 of Figure 1; Figure 3 is an enlarged side view of the exterior of the transmission box, some elements being broken away and others being shown in section with the position of the parts corresponding to neutral condition of the transmission; Figure 4 is a sectional view taken on the line 4—4 of Figure 3, showing the gearing within the gear box and the manner in which part of the control mechanism is associated therewith; Figure 5 is a sectional view of the gearing, said view being taken on the line 5—5 of Figure 4; Figures 6, 7, and 8 are sectional views taken on lines 6—6, 7—7, and 8—8 of Figure 3; Figures 9, 10, 11, and 12 are sectional views taken on lines 9—9, 10—10, 11—11, and 12—12 of Figure 5 and showing different parts of the slidable clutch element and synchronizing means; Figure 13 is an external view of the transmission box similar to Figure 3 but showing the parts in high speed position; Figure 14 is a cross-sectional view taken on line 14—14 of Figure 13; Figure 15 is an external view of the transmission box showing the parts in second speed position; Figure 16 is a perspective view of the double arm shifting lever; Figure 17 is a perspective view of the selecting member associated with the double arm lever; and Figure 18 is a view of the mechanism mounted on the lower end of the steering column, said view being taken on the line 18—18 of Figure 1.

Referring to Figure 1, the engine 1 of the motor vehicle is connected to the propeller shaft 2 by my novel change speed gearing 3 mounted in housing 4. Interposed between the engine and the change speed gearing is the usual main friction clutch (not shown) which is positioned in housing 5 and adapted to be controlled by clutch pedal 6. The clutch pedal is secured to a clutch operating shaft 7 journaled in the forward end of the transmission casing and connected to operate the clutch in a well-known manner.

As best shown in Figures 4 and 5, the drive shaft 8 of the change speed gearing is journaled in the forward end of the transmission housing 4 and has formed on its inner end a driving gear 9. This gear is in constant mesh with gear 10 of a cluster of gears rotatably mounted on shaft 11 positioned in the housing at the side of the axis of the drive shaft. The driven shaft 12, which is connected to the propeller shaft 2 by the usual universal joint (not shown) is journaled in the rear end of the housing and has its forward end piloted in gear 9 of the drive shaft. This driven shaft has a rear splined portion 13, a smaller smooth portion 14 at its forward end, and an intermediate splined portion 15. The rear splined portion 13 has slidably and non-rotatably mounted thereon a combined low and reverse gear 16. When this gear is moved forwardly from its central neutral position shown, it meshes with low gear 17 of the cluster of gears which is driven from the drive shaft through gear 10 previously referred to. When gear 16 is moved rearwardly it meshes with an idler gear 18 which is constantly driven by gear 19 on the rear end of the cluster of gears, thus establishing reverse gear drive.

The smooth forward end 14 of the driven shaft has rotatably mounted thereon a sleeve 20 and formed on the rear end thereof are clutch teeth 21. These clutch teeth are adapted to cooperate with a clutch element 22 slidably mounted on the intermediate splined portion 15 of the driven shaft. When clutch element 22 is moved forwardly from its inoperative position shown in Figure 5 to engage teeth 21, sleeve 20 will be connected to the driven shaft. When the clutch element 22 is disengaged, the driven shaft rotates relatively to the sleeve.

Loosely journaled on sleeve 20 is a second speed gear 23 which is in constant mesh with gear 24 of the cluster of gears. The gear 23 is held from longitudinal movement with respect to the sleeve by a pin 25 carried by the sleeve and projecting into an annular groove 26 in the gear. The forward side of gear 23 carries clutch teeth 27 and extending beyond these teeth is an annular flange 28 having a conical surface 29. Mounted on this flange is an annular synchronizing element 30 having teeth 31 and being provided with a conical surface 32 for cooperation with conical surface 29. The conical surfaces are normally biased away from each other by an annular wavy spring 33 interposed between the synchronizing element 30 and the portion of gear 23 carrying the clutch teeth 27.

The inner end of gear 9 on the drive shaft is also formed with clutch teeth 34 and extending beyond these teeth is an annular flange 35 having a conical surface 36. Mounted on this flange is an annular synchronizing element 37 having teeth 38 and being provided with a conical surface 39 for cooperation with conical surface 36. An annular wavy spring 40 normally biases the conical surfaces away from each other.

The external surface of sleeve 20 is provided with splines 41 and slidably and non-rotatably mounted thereon is an annular member 42 interposed between the two synchronizing elements 30 and 37, said elements normally abutting member 42 as the result of action of the springs 33 and 40. The outer surface of member 42 is provided with splines 43 and slidably mounted thereon is a clutch element 44 having internal teeth 45 cooperating with splines 42. The central portion of some of teeth 45 is formed to provide converging surfaces 46 with which cooperates a ball 47 carried by member 42 and biased to engage the surface 46 by a spring 48.

The teeth 45 on the clutch element are of such length that they can be simultaneously in engagement with the teeth of both of the synchronizing elements. However, the teeth will only engage those of one of the synchronizing elements whenever the clutch element is moved to engage with the teeth on the gear with which the element is associated. Due to the spring-pressed ball and the surfaces 46 on the clutch element, the clutch element will always be caused to be biased toward engagement with the teeth on one of the gears 23 or 9. Thus there is no neutral position for the clutch element.

If it be assumed, as shown in Figure 5, that clutch element 44 is in a position to connect the second speed gear with sleeve 20 and it is desired to shift the clutch element to connect the driving shaft 8 to sleeve 20, the movement of the clutch element to the left will, by means of the spring-pressed balls acting on the inclined surfaces, cause the synchronizing element 37 to become operative. This will tend to bring the speed of the clutch element 44 to the same speed as the driving shaft 8. Continued movement of the clutch element 44 to the left will then result in teeth 45 engaging with teeth 34 to make the connection between sleeve 20 and the driving shaft. The teeth 45 will be disengaged from teeth 27 of the second speed gear just prior to engagement of teeth 45 with teeth 34. Due to the arrangement of inclined surfaces 46, the synchronizing action will cease at the time teeth 45 engage teeth 34. When the clutch element 44 is returned to engagement with teeth 27 of gear 23, the synchronizing element 30 will be caused to be operative in the same way as synchronizing element 37.

One side of the transmission housing 4 is left open and mounted to enclose this opening is a closure plate 49. In the rear end of this plate is journaled a shaft 50, the exterior end of which has secured thereto an arm 51. Secured to the inner end of this shaft is an upwardly extending arm 52 which has journaled in its end a shifting fork 53 engaging the groove 54 of the combined reverse and low speed gear 16. Also journaled in the closure plate at a point forward of shaft 50 is a second shaft 55, the outer end of which has secured thereto an arm 56 and the inner end of which has secured thereto an arm 57. Journaled in the end of this latter arm is a shifting fork 58 engaging groove 59 in the clutch element 22 on the driven shaft.

In order that the shifting fork 53 may be held in its different positions, arm 52 is provided with a flange 60 having therein recesses 61 for cooperation with a spring-pressed plunger 62 carried by the closure plate. Also, in order to hold the shifting fork 58 in its different positions, arm 57 is provided with a flange 63 having recesses 64 for cooperation with a spring-pressed detent 65 carried by the closure plate.

To prevent the shifting forks 53 and 58 from being moved to operating position simultaneously, there is pivotally mounted on the closure plate an interlocking member 66 having arms 67 and 68. The arm 67 overlies the journaled end of shifting fork 53 and is provided with a recess 69 for engaging the top of said fork end. The arm 68 overlies the journaled end of shifting fork 58 and has a recess 70 for cooperation with said end. When the shifting fork 53 is moved, it will cause arm 68 to move downwardly so that recess 70 will receive the end of the shifting fork 58 to hold said fork from being moved by arm 57. Similarly, when shifting fork 58 is moved, arm 67 is caused to move downwardly so that the recess 69 will receive the end of shifting fork 53 and thus hold said fork from movement. The interlocking member is also provided with abutment surfaces 71 and 72 in order to limit the swinging movement of arm 52 which carries shifting fork 53. There is also provided abutment surfaces 73 and 74 for limiting the movement of shifting fork 58. It is to be noted that this latter shifting fork has only one operative position whereas the shifting fork 53 has two operative positions.

The external arm 51, by which the combined low and reverse speed gear 16 is shifted, is connected to a rod 75 which extends to a point adjacent the lower end of the steering column 76 where it is connected to an arm 77. Similarly, the external arm 56, which controls the shifting of clutch element 22, is connected by rod 78 to arm 79 positioned adjacent arm 77. The hubs of the arms 77 and 79 receive a shaft 80 which extends upwardly to a point below the steering wheel 81 of the vehicle. The lower end of this shaft 80 is journaled in a bracket 82 carried by the steering column which is so arranged that it will hold arms 77 and 79 from separating. The shaft 80 carries a pin 83 for cooperation with slots 84 and 85 in the hubs of arms 77 and 79, respectively. When the pin is in slot 84, shaft 80 can turn arm 77, and when said pin is in slot 85, the shaft can turn arm 79. A sleeve 86 is positioned between the hubs of the arms to maintain them in proper spaced relation. The pin 83 is normally biased by a spring 87 so that pin 83 will lie in slot 85, said spring being interposed between bracket 82 and a washer 88 on the end of shaft 80.

The upper end of shaft 80 is journaled in a bracket 89 secured to the steering column at a point just below the steering wheel. Secured to this end of the shaft is a hand lever 90 whereby the shaft can be rotated and also raised in order to connect it to arm 77. Also secured to the bracket is a pointer 91 which is so arranged as to extend into an H-shaped slot formed in said bracket. The cross slot 92 of the H slot is the neutral position of the gearing and indicated by the letter "N." The ends of the legs of the slot are variously designated by the indicia "R," "Lo" and "Hi," thus indicating reverse, low, and high speed ratio conditions of the gearing.

In the forward end of the closure plate there is mounted a third shaft 93 which has secured to its inner end an arm 94 and journaled in the upper end of this arm is a shifting fork 95 which extends into groove 44a of clutch element 44. The outer end of shaft 93 has secured thereto a double arm actuating lever 96 shown in perspective in Figure 16. Also, loosely mounted on the outer end of shaft 93 and positioned between the double arm lever and the surface of the closure plate is a selecting member 97 shown in perspective in Figure 17. The hub of this selecting member is formed with two surfaces 98 and 99 which meet at an apex 100. The member also carries two arms 101 and 102. The double arm actuating lever 96 is formed with recesses 103 and 104 on opposite sides of the axis of shaft 93. The upper arm of lever 96 carries a pin 105 to which is connected one end of a spring 106, the other end being connected by a flange 107 of arm 101 of member 97 to thereby bias this member so that flange 107 is in engagement with the double arm lever 96 (see Figure 15). The arm 102 of member 97 carries a pin 108 which is adapted to be engaged by arm 109 extending forwardly from and secured to shaft 55. When shaft 55 is in its normally inoperative position, that is, its position shown in Figure 3 wherein the clutch element 22 is disengaged, arm 109 will engage pin 108 and move member 97 in a counter-clockwise direction relative to the double arm lever 96 and against the bias of spring 106 if lever 96 is in the position shown in said figure. When shaft 55 is moved to engage clutch element 22, arm 109 will be rotated in a counter-clockwise direction away from pin 108, thus permitting member 97 to be rotated by spring 106 and to the position shown in Figure 15.

The clutch shaft 7 has secured thereto an upstanding arm 110 and pivoted to the upper end thereof is a link 111 extending rearwardly to a point beyond the apex 100 of member 97. Carried by this rear end of the link is a pin 112 for cooperation with recesses 103 and 104 of the double arm lever 96. Link 111 is biased to a predetermined position by plunger 113 which cooperates with a flat surface 114 on the link. The plunger 113 is backed by a spring 115.

In order that the shifting fork 95 may be held in its operative positions, arm 94 is provided with a flange 116 having recesses 117 with which cooperates a spring-pressed detent 118 mounted in the closure plate. The recesses converge to form a V-shaped surface having an apex 117', this apex being positioned slightly off center as shown.

There is also shown in Figure 1 a spring 119 which is connected to arm 120 extending from the clutch pedal in order to hold the clutch pedal in its normal clutch-engaged position.

Referring now to the operation of the change speed transmission and control means therefor, the transmission will be in neutral position when the hand lever 90 is in the position shown in Figure 2. Under these conditions the pointer 91 will be positioned opposite the open end of the "Hi" leg of the H slot at the point marked "N," and shaft 80 will be connected to arm 79 by pin 83. The arms, linkage, etc., on the exterior of the closure plate will be in the positions shown in Figure 3. The gearing and clutch elements will be in the positions shown in Figure 5. The slidable clutch element 44 may, however, be in its forward position to connect sleeve 20 to the driving shaft 8 and if such is the case, then the double arm lever 96 will be in the position shown in Figure 13. The selecting member will be in the position shown in Figures 3 and 13.

If it is desired to place the change speed transmission in either low or reverse, the main clutch is disengaged and the hand lever 90 pulled upwardly to connect shaft 80 with arm 77. If the hand lever is now rotated so that pointer 91 is placed in the closed end R of the slot, the transmission will be placed in reverse gear ratio by sliding gear 16 rearwardly to mesh it with idler gear 18. If the hand lever is moved to place pointer 91 in the closed end Lo of the slot, then gear 16 will be meshed with gear 17 to produce low speed ratio. Thus it is seen that low and reverse are obtained in a well-known manner.

If it is desired to obtain the higher speed ratios the main clutch is first disengaged by fully depressing the clutch pedal to a position beyond where the clutch is just disengaged and then hand lever 90 moved so that the pointer 91 is in the closed end of the slot marked "Hi." This movement of the hand lever results in the steering column shaft 80 rotating arm 79 and, by means of link 78, rotating shaft 55 in a counter-clockwise direction. This will cause the shifting fork 57 to engage clutch element 22 and thus connect sleeve 20 to the driven shaft.

When the main friction clutch was disengaged, apex 100 on the selecting member 97 was in such position (Figure 3) as to cause pin 112 on link 111 to ride down into recess 104 of the double arm lever 96. If the double arm lever 96 should be in the position shown in Figure 3, then it will not be actuated as clutch element 44 is in the position shown in Figure 5 and the second speed gear 23 connected to sleeve 20. If the double arm lever should be in the position shown in Figure 13 wherein the corresponding position of clutch element 44 would be such as to connect sleeve 20 to the drive shaft 8, then the disengaging movement of the clutch pedal would cause a clockwise rotation of the double arm lever and place clutch element 44 in the position shown in Figure 5. Thus it is seen that when the clutch pedal is depressed to a position beyond that required to disconnect the main clutch and the hand lever 90 moved so that the pointer indicates "Hi," the transmission will always be in second speed ratio which will transmit power when the clutch pedal is released.

Upon the clutch pedal being released, link 111 will be returned to such a position that pin 112 will be back of apex 100 of the selecting member 97. Due to the fact that shaft 55 has been rotated in a counterclockwise direction when clutch element 22 was engaged, arm 109 will be moved away from pin 108 on the selecting member (see Figure 13). Since this selecting member is thus free to be rotated and the double arm lever is in the position shown in Figure 3, spring 106 will position the selecting member so that apex 100 will lie below pin 112 carried by link 111.

If it should now be desired to obtain high speed ratio it is only necessary to depress the clutch pedal and then release it. There is no necessity for making any movement of the hand lever 90. When the clutch pedal is depressed, pin 112, due to the position of apex 100, will ride into recess 103 of the double arm lever and then rotate the double arm lever to the position shown in Figure 13. The selecting member 97 will also be rotated with the lever due to the spring connection 106. This will cause rotation of shaft 93 and a shifting of clutch element 44 from the position shown in Figure 5 to the position shown in Figure 14. The gear 23 will thus be disconnected from sleeve 20 and the drive shaft 8 connected to said sleeve. Since sleeve 20 is already connected to the driven shaft, the driving and driven shafts will, therefore, be connected for direct or high speed drive. When clutch element 44 is shifted the synchronizing element 37 will be caused to function, thus bringing clutch teeth 34 on the gear and clutch teeth 45 on the clutch element to approximately the same speeds whereby they can easily engage. When the clutch pedal is released to reengage the main friction clutch, the vehicle will be driven forward with the transmission in high speed ratio.

When the clutch pedal is released, link 111 will again assume the position shown in Figure 3 wherein it will lie below apex 100 of the selecting member. The mechanism is now set so that if the clutch pedal is again depressed, link 111 will be connected to the lower arm of the double arm lever to rotate the lever in a clockwise direction to cause second speed ratio to be again operative. Successive depressing and releasing of the main clutch pedal will alternately cause high and second speed ratios to become operative.

When it is desired to again neutralize the transmission, the main clutch will be disengaged and hand lever 90 moved so that the pointer is opposite the letter "N." This will cause clutch element 22 to be disengaged from teeth 21, thus disconnecting the sleeve from the driven shaft. No power can now be transmitted by the gearing. The disconnecting of clutch 22 again results in arm 109 on shaft 55 being moved to the position shown in Figure 3, thus engaging pin 108 and setting apex 100 of the selecting member so that the second speed gear will be connected to sleeve 20 when the clutch pedal is again fully depressed. Thus it is seen that whenever the gearing is neutralized, the control mechanism is so set that the second speed ratio of the two top speed ratios will always be the first to become operative.

In connection with the detent 118 and the V-shaped surface between the recesses 117, it will be noted that the clutch element 44 will always be biased into either the high or second speed operative position and cannot assume an inoperative position due to the apex 117'. The V-shaped surface also insures that the clutch element 44 will not be shifted from an operative position accidentally by a slight depressing of the clutch pedal beyond the clutch-disengaged position. By having the apex 117' slightly off center as shown, a greater movement of the clutch pedal will be required to shift from high speed to second speed than that required to shift from second speed to high speed. This will give the operator less chance to make an accidental shift when the transmission is in high and it is desired to declutch without shifting. The compressing of the detent spring to make it pass over the apex 117' also will indicate to the operator when a shift is being made since the operator feels when the detent passes the apex.

Being aware of the possibility of modifications in the particular structure herein described without departing from the fundamental principles of my invention, I do not intened that its scope be limited except as set forth by the appended claims.

Having fully described my invention, what I claim as new and desire to secure by Letters Patent of the United States is:

1. In mechanism of the class described, a driving shaft, a driven shaft, a sleeve mounted on the driven shaft for free rotation in either direction relatively to said shaft, a gear rotatably mounted on the sleeve, means for driving said gear from the drive shaft, a clutch element for connecting the sleeve to and disconnecting it from the driven shaft, means comprising a slidable clutch element non-rotatably mounted on the sleeve for alternately connecting the drive shaft to the sleeve and the gear to the sleeve by movements in opposite directions, means for causing the last named clutch element to be in either of its operative positions but incapable of causing the clutch element to be in an inoperative position, and means independent of the last named means for operating the first named clutch element at will.

2. In mechanism of the class described, a driving shaft, a driven shaft, a sleeve rotatably mounted on the driven shaft, a gear rotatably mounted on the sleeve, means for driving said gear from the drive shaft, a clutch element for connecting the sleeve to and disconnecting it from the driven shaft, means comprising a slidable clutch element non-rotatably mounted on the sleeve for alternately connecting the drive shaft and the gear to the sleeve by movements in opposite directions, control means for moving said last named clutch element so that it will be in either of its operative positions, other control means independent of the first named control means for operating the first named clutch element at will, and means for conditioning the first named control means so as to insure that the gear will be connected to the sleeve whenever said first named control means is operated prior to movement of the other control means from an inoperative position to connect the sleeve to the driven shaft.

3. In mechanism of the class described, a driving shaft, a driven shaft, a sleeve rotatably mounted on the driven shaft, a gear rotatably mounted on the sleeve, means for driving said gear from the drive shaft, a clutch element for connecting the sleeve to and disconnecting it from the driven shaft, means comprising a slidable clutch element non-rotatably mounted on the sleeve for alternately connecting the drive shaft to the sleeve and the gear to the sleeve by movements in opposite directions to thus obtain different speed ratios, means for causing the last named clutch element to be in either of its operative positions but incapable of causing the clutch element to be in an inoperative position, means including a slidable element for obtaining other speed ratios, means for operating the last named slidable element, means for operating the first named clutch element, and a single hand lever for selectively operating either of the last named means.

4. In mechanism of the class described, a driving shaft, a driven shaft, a sleeve rotatably mounted on the driven shaft, a gear rotatably mounted on the sleeve, means for driving said gear from the drive shaft, a clutch element for connecting the sleeve to and disconnecting it from the driven shaft, means comprising a slidable clutch element non-rotatably mounted on the sleeve for alternately connecting the drive shaft to the sleeve and the gear to the sleeve by movements in opposite directions to thus obtain different speed ratios, means for causing the last named clutch element to be in either of its operative positions, means including a slidable element for obtaining other speed ratios, means for operating the last named slidable element, means for operating the first named clutch element, a hand lever for selectively operating either of the last named means, and means controlled by the means for operating the first named clutch element when in an inoperative position for causing the slidable clutch element to be connected to the gear when operated by its operating means.

5. In mechanism of the class described, a change speed transmission having a shiftable element movable to two different positions to obtain two different speed ratios, a shifting fork for the shiftable element, a shaft connected to operate the shifting fork by a rotation in opposite directions, a double arm lever on the shaft, a manually-controlled reciprocable actuating means selectively connectable with the arms of the lever to alternately rotate it in opposite directions by successive reciprocations of the reciprocable actuating means, and means operable at will and without movement of the lever for causing the actuating means to be connected to one arm of the lever to thereby actuate the lever by said arm in the event said selective connecting means is so conditioned that the other arm is the one which would be connected to the pedal and the lever actuated thereby.

6. In mechanism of the class described, a change speed transmission having a shiftable element movable to two different positions to obtain two different speed ratios, a shifting fork for the shiftable element, a shaft connected to operate the shifting fork by a rotation in opposite directions, a double arm lever on the shaft, a manually-controlled member, means for selectively connecting said manual member to the two arms of the lever by a mechanical linkage in order to alternately rotate it in opposite directions by successive movements of the manual member, and other manually-operated means for so controlling said selectively connecting means at will and without movement of the lever that the first manual member can be caused to be connected to one arm of the lever to thereby actuate the lever by said arm in the event said selective connecting means is so conditioned that the other arm is the one which would be connected to said manual member and the lever actuated thereby.

7. In mechanism of the class described, a change speed transmission having a shiftable element movable to two different positions to obtain two different speed ratios, a shifting fork for the shiftable element, a shaft connected to operate the shifting fork by a rotation in opposite directions, a double arm lever on the shaft, a pedal, means for selectively connecting said pedal to the arms of the lever by a mechanical linkage in order to alternately rotate it in opposite directions by successive reciprocations of the pedal, and means for so controlling said selectively connecting means at will and without movement of the lever that the pedal can be caused to be connected to one arm of the lever to thereby actuate the lever by said arm in the event said selective connecting means is so conditioned that the other arm is the one which would be connected to the pedal and the lever actuated thereby.

8. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear, a hand lever, mechanism for connecting the hand lever to engage and disengage the first named clutch element, and control means for the double clutch element operable by successive movements of the clutch pedal beyond clutch disengaged position for alternately causing said clutch element to connect the sleeve to the drive shaft and to the gear.

9. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear, a hand lever, mechanism for connecting the hand lever to engage and disengage the first named clutch element, control means for the double clutch element operable by the successive movements of the clutch pedal beyond clutch disengaged position for alternately causing said clutch element to connect the sleeve to the drive shaft and to the gear, and means controlled by the hand lever for insuring that the double clutch element will be placed in the position connecting the gear to the sleeve if not so positioned when the clutch pedal is depressed prior to the hand lever being placed in a position to connect the sleeve to the driven shaft.

10. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear to obtain different speed ratios, control means for the double clutch element operable by successive movement of the clutch pedal beyond clutch disengaged position for alternately causing said double clutch element to connect the sleeve to the drive shaft and to the gear, mechanism for engaging and disengaging the first named clutch element, means comprising a slidable element for obtaining other speed ratios, mechanism for operating said slidable element, and a hand lever selectively connectable to operate the last two mechanisms.

11. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear to obtain different speed ratios, control means for the double clutch element operable by successive movement of the clutch pedal beyond clutch disengaged position for alternately causing said clutch element to connect the sleeve to the drive shaft and to the gear, mechanism for engaging and disengaging the first named clutch element, means comprising a slidable element for obtaining other speed ratios, mechanism for operating said slidable element, a hand lever selectively connectable to operate the last two mechanisms, and means operable when the hand lever is in a position where the first named clutch element is disengaged for so controlling the control means for the double clutch element that said double clutch element will be placed in the position connecting the gear to the sleeve, if not so positioned, when the clutch pedal is depressed beyond clutch disengaged position.

12. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear, a shaft connected to shift the double clutch element in opposite directions to its operative positions, a double arm lever on the shaft, means for alternately connecting the clutch pedal to the arms of the lever and operating said shaft in opposite directions upon successive depressions of the clutch pedal beyond clutch disengaged position, a hand lever, and mechanism for connecting the hand lever to engage and disengage the first named clutch element.

13. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear, a shaft connected to shift the double clutch element in opposite directions to its operative positions, a double arm lever on the shaft, means for alternately connecting the clutch pedal to the arms of the lever and operating said shaft in opposite directions upon successive depressions of the clutch pedal beyond clutch disengaged position, a hand lever, mechanism for connecting the hand lever to engage and disengage the first named clutch element, and means operable by the hand lever when in a position where the first named clutch element is disengaged for causing said clutch pedal to place the double clutch element in a position to connect the gear to the sleeve, said last named means being inoperable when the hand lever is moved to connect the sleeve to the driven shaft.

14. In gear shifting mechanism, a member shiftable in opposite directions to different positions for obtaining different speed ratios, a rotatable shaft connected to said shiftable member, a double arm lever on said shaft, reciprocable actuating means, and selecting means for causing said reciprocable actuating means to be alternately connected to the arms of the lever upon successive reciprocations of the reciprocable member, and means for so controlling said selecting means at will and independently of any lever movement that the reciprocable means will not be caused to be connected to one arm of the lever notwithstanding said reciprocable means may be caused to be successively operated.

15. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear, a shaft connected to shift the double clutch element in opposite directions to its operative positions, a double arm lever on the shaft, a reciprocable actuating element controlled by the depression of the clutch pedal beyond clutch disengaged position, means for alternately connecting the reciprocable element to the arms of the lever and thereby operating said shaft in opposite directions upon successive depressions of the clutch pedal beyond clutch disengaged position, means for operating the first named clutch element, and means operable when the first named clutch element is inoperative for preventing the reciprocable element from being connected to the arm of the lever which is actuated for causing the double clutch element to connect the sleeve to the driving shaft.

16. In a motor vehicle change speed transmission and control mechanism for association with an engine and main clutch having a clutch pedal, a driving shaft for connection to the engine through the main clutch, a driven shaft, a sleeve rotatably mounted on the driven shaft, a rotatably mounted second speed gear, a counter-shaft and gearing for rotating the second speed gear, a slidable clutch element for connecting the sleeve to and disconnecting it from the driven shaft, a second slidable clutch element movable in opposite directions for alternately connecting the driving shaft and the second speed gear to the sleeve, means for obtaining low speed ratio and reverse speed ratio and comprising gears driven by the counter-shaft and a slidable element, a hand lever, connecting means operable by the hand lever for selectively operating the slidable element to obtain low and reverse speed ratios and to operate the clutch element to connect and disconnect the sleeve to and from the driven shaft, means operable by successive depressions of the clutch pedal beyond clutch disengaged position for operating the second slidable clutch element in order to alternately connect the sleeve to the driving shaft and to the second speed gear, and means for insuring that the second slidable clutch element will connect the second speed gear to the sleeve when the hand lever is initially positioned to cause the sleeve to be connected to the driven shaft and the clutch pedal has been depressed and released.

17. In a change speed transmission and control mechanism for association with an engine and a main clutch having a clutch pedal, a driving shaft for connection to the engine through the main clutch, a driven shaft, a sleeve rotatably mounted on the driven shaft, a gear rotatably mounted on the sleeve, means for driving the gear from the driving shaft, a clutch element for connecting the sleeve to and disconnecting it from the driven shaft, a slidable double clutch element for alternately connecting the sleeve to the driving shaft and the gear, a shaft connected to shift the double clutch element in opposite directions to its operative positions, a double arm lever on the shaft, means comprising a connecting link for connecting the clutch pedal to the arms of the lever and operating said shaft in opposite directions upon successive depressions of the clutch pedal beyond clutch disengaged position, a selecting member associated with the lever for causing the link to be alternately connected to the arms, a hand lever, mechanism for connecting the hand lever to engage and disengage the first named clutch element, and means operable by the hand lever when in an inoperative position for causing said selecting member to be in such a position that the link will be caused to be so connected to the double arm lever that the clutch pedal when depressed will place the double clutch element in a position to connect the gear to the sleeve, said last named means being inoperable when the hand lever is moved to connect the sleeve to the driven shaft.

18. In a change speed transmission and control mechanism therefor, axially aligned first and second shafts, clutch teeth carried by the first shaft, a sleeve rotatably mounted on the second shaft, a gear rotatably mounted on the sleeve and provided with clutch teeth, means for driving the gear from the first shaft, clutch means for connecting the sleeve to the second shaft, means for actuating the clutch means to connect and disconnect the sleeve from the driven shaft, a slidable double clutch element non-rotatably mounted on the sleeve, actuating means for alternately causing the double clutch element to be connected to the teeth carried by the first shaft or the teeth on the gear, said last named actuating means being operable independently of the first named actuating means, and means for preventing the double clutch element from having an inoperative position where it is disconnected from both clutch teeth.

19. In a change speed transmission and control mechanism therefor, axially aligned first and second shafts, clutch teeth carried by the first shaft, a sleeve rotatably mounted on the second shaft, a gear rotatably mounted on the sleeve and provided with clutch teeth, means for driving the gear from the first shaft, clutch means for connecting the sleeve to the second shaft, means for actuating the clutch means, a slidable double clutch element non-rotatably mounted on the sleeve, synchronizing means associated with the double clutch element and the clutch teeth on both the shaft and the gear, actuating means for moving the double clutch element alternately in opposite directions so as to be connected to the teeth carried by the first shaft or the teeth on the gear, said last named actuating means being operable independently of the first named actuating means, and means associated with the double clutch element for preventing it from being in an inoperative position.

20. In a change speed transmission and control mechanism for association with an engine and a main clutch having a clutch pedal, axially aligned first and second shafts, clutch teeth carried by the first shaft, a sleeve rotatably mounted on the second shaft, a gear rotatably mounted on the sleeve and provided with clutch teeth, means for driving the gear from the first shaft, clutch means for connecting the sleeve to the second shaft, hand-operated means for actuating the clutch means, a slidable double clutch element non-rotatably mounted on the sleeve, synchronizing means associated with the double clutch element and the clutch teeth on both the shaft and the gear, actuating means controlled by depressing the clutch pedal for moving the double clutch element alternately in opposite directions so as to be connected to the teeth carried by the first shaft or the teeth on the gear, said last named actuating means being operable independently of the first named hand-operated actuating means, and means associated with the double clutch element for preventing it from being in an inoperative position.

GLENN T. RANDOL.